July 16, 1963
H. BERENS
3,097,540
AUTOMATIC CHAIN TIGHTENING MECHANISM FOR INFINITELY VARIABLE CONE PULLEY GEARS
Filed July 9, 1962
2 Sheets-Sheet 1
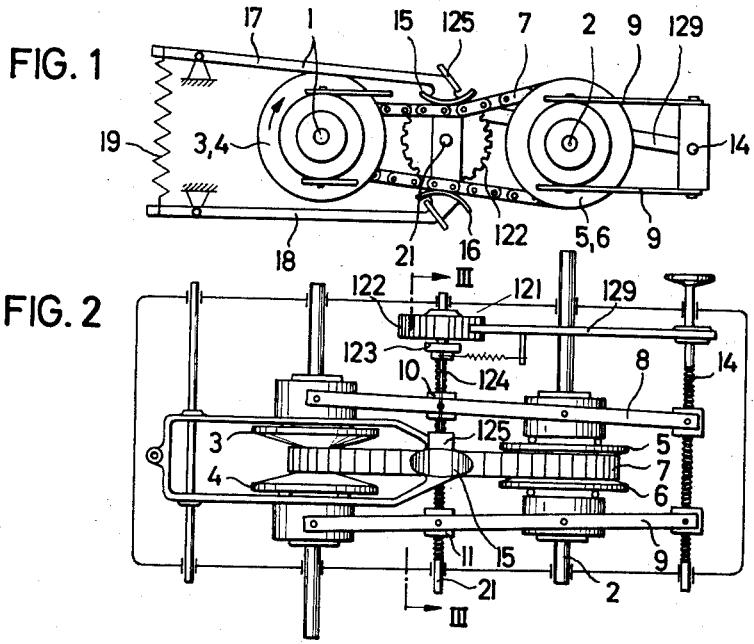
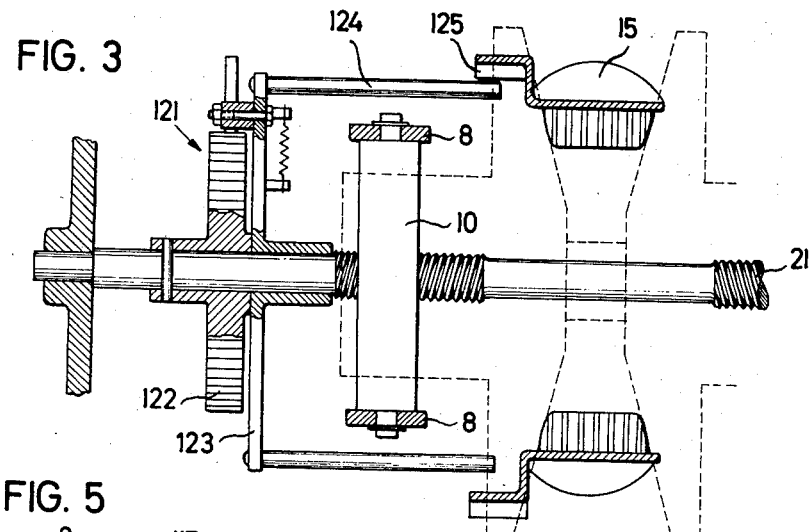
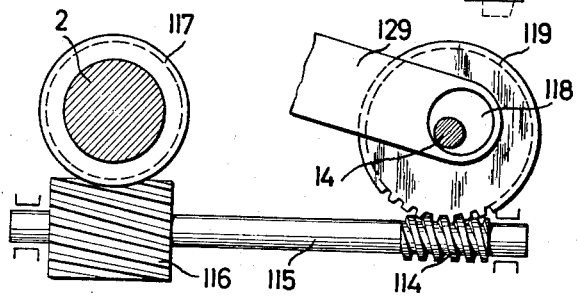
INVENTOR.
HEINRICH BERENS
BY Bailey, Stephens & Huettig July 16, 1963

H. BERENS 3,097,540

AUTOMATIC CHAIN TIGHTENING MECHANISM FOR INFINITELY
VARIABLE CONE PULLEY GEARS

Filed July 9, 1962

INVENTOR.
HEINRICH BERENS
BY
Bailey, Stephens & Huettig

United States Patent Office 3,097,540
Patented July 16, 1963

3,097,540
AUTOMATIC CHAIN TIGHTENING MECHANISM FOR INFINITELY VARIABLE CONE PULLEY GEARS
Heinrich Berens, Bad Homburg vor der Hohe, Germany, assignor to Reimers Getriebe K.G., Ascona, Switzerland, a firm of Switzerland
Filed July 9, 1962, Ser. No. 208,438
Claims priority, application Germany Mar. 17, 1962
4 Claims. (Cl. 74—230.17)

The present invention relates to a mechanism for automatically tightening the endless driving belt or chain of an infinitely variable cone pulley transmission of the type as described in the copending application of Fritz Kärger and Carl Gausman, Serial No. 187,238, filed on April 13, 1962, in which tension shoes are provided which slide under spring pressure along the belt or chain (both being hereafter collectively referred to as a "chain") and in which the chain running between two pairs of conical pulley disks, which are adjustable relative to each other in opposite axial directions by means of control levers, may be tightened by means of a spindle which carries the control levers and permits the distance between the conical disks of each pair to be adjusted in the same direction. This mechanism is designed so that the chain-tightening means may be driven temporarily by normally moving elements of the transmission namely, at such times during the operation of the transmission when it becomes necessary to tighten the chain and until it has been readjusted to the proper tension.

The means for transmitting a driving force from these normally moving elements of the transmission to the tightening spindle—and always in the direction in which the chain will be tightened—may be made of different designs. In transmissions of the type in which tension shoes slide under spring pressure along the stringers of the chain it is evident that, since the position of these tension shoes is necessarily determined by the tension of the chain, a change in this position as the result of a decrease in the tension of the chain may also be employed for instigating the chain-tightening operation.

In the above-mentioned copending application, a mechanism of this kind has already been described, in which the change in position of the levers on which the tension shoes are mounted is employed for operatively connecting a ratchet wheel, which is mounted on the tightening spindle, with a driving element which is actuated by one of the transmission shafts. Such a mechanism is, however, relatively expensive.

It is an object of the present invention to provide a chain tightening mechanism of the above-mentioned type which is much more simple and inexpensive than the mechanism referred to above and which is likewise designed for use in a transmission which is provided with tension shoes which are slidable under spring pressure on the chain stringers. This object may be attained according to the invention by mounting on each tension shoe a member with an inclined cam surface which, when the tension of the chain decreases, presses upon a rod of a rocker, whereby this rocker is pivoted and releases a shift rod which is eccentrically mounted on the setting spindle of the transmission which actuates a ratchet wheel which is mounted on the tightening spindle. By these means it is possible to initiate the tightening of the spindle in such a manner that, when the transmission ratio of the transmission is varied by the setting spindle, the tightening spindle will be turned until the rocker has returned to its original rest position, that is, until the cam surfaces are disengaged from the rods which are mounted on the rocker. This does not occur until the chain has lifted the tension shoes pressing thereon, that is, until the chain has been tightened to its proper tension. Since it is the sense and purpose of an infinitely variable transmission to attain the best possible operating conditions by varying the speed ratio in response to a change in the driving speed, it is usually necessary to readjust the transmission ratio rather frequently either upwardly or downwardly by means of the setting spindle. The present invention now provides that any such adjustment of the setting spindle will be employed for also tightening the chain, provided that its tension has decreased to such an extent that the resulting change in position of the tension shoes will permit the shift rod which is eccentrically mounted on the tension spindle to act upon the ratchet wheel. The high speed reduction ratio which is provided for driving the setting spindle or the slow rotation thereof when manually adjusted easily permits both actions to be carried out at the same time, that is, the adjustment of the transmission ratio and the retightening of the chain. Naturally, this requires a slightly greater force. According to another feature of the invention this increased force requirement may, however, also be compensated by driving the shift rod which actuates the ratchet wheel also by means of the main transmission shaft through a double helical gear unit which reduces the movements of the main transmission shaft very highly so that the shift rod will carry out continuous reciprocating movements of a low frequency. When the rocker is pivoted by the pressure of the cam surfaces on the tension shoes against the rods on the rocker, the operation of retightening the tightening spindle will therefore be effected immediately by the reciprocating shift rod rather than later by the adjustment of the transmission ratio of the transmission by the setting spindle, as occurred in the tightening mechanism as described in the mentioned copending application. The ratchet device is designed so that when the rocker is not pivoted away a nose on a setting element which is mounted on the rocker will hold the shift rod by means of a draw spring in a position in which it is disengaged from a ratchet wheel of the ratchet device which is connected to the tightening spindle, while when the rocker is pivoted away, the shift rod will be drawn by the spring against the ratchet wheel and turn the same in a step-by-step movement by means of a projecting edge on the reciprocating shift rod.

The objects, features, and advantages of the present invention will become more clearly apparent from the following detailed description thereof which is to be read with reference to the accompanying drawing, in which—

FIGURE 1 shows a side view of a cone pulley transmission without its housing according to a first embodiment of the invention;

FIGURE 2 shows a plan view of the transmission according to FIGURE 1;

FIGURE 3 shows a cross section taken along line III—III of FIGURE 2;

FIGURES 4a to 4c show diagrammatic illustrations of different stages of the operation of parts of the mechanism according to FIGURES 1 to 3; while FIGURE 5 shows a diagrammatic illustration of a second embodiment of the invention.

Figure 4A:
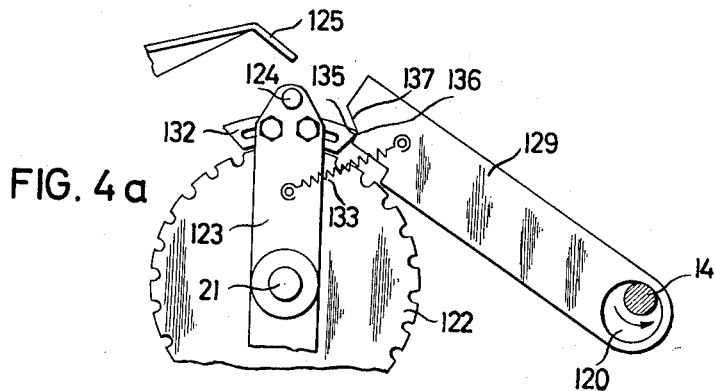

The infinitely variable transmission as illustrated in FIGURES 1 to 3 has two transmission shafts 1 and 2 which carry two pairs of conical pulley disks 3, 4 and 5, 6, respectively, which are connected to each other by an endless link chain 7. For varying the transmission ratio of the transmission, control levers 8 and 9 are provided which are pivotably mounted on tension blocks 10 and 11 and are pivotably connected to threaded blocks on a setting spindle 14.

The tension blocks 10 and 11 carrying the control levers 8 and 9 are provided with screw threads with opposite pitch directions which are screwed on a tightening spindle 21 which, when turned in one direction, will move the tension blocks 10 and 11 toward each other and thereby tighten the chain 7. By turning the setting spindle 14 which is likewise provided with screw threads with opposite pitch directions, the control levers 8 and 9 will vary the axial distance between the conical disks 3 and 4 in one direction and simultaneously and to an equal extent the axial distance between disks 5 and 6 in the opposite direction so that the transmission ratio of the transmission will thus be changed.

Figure 4B:
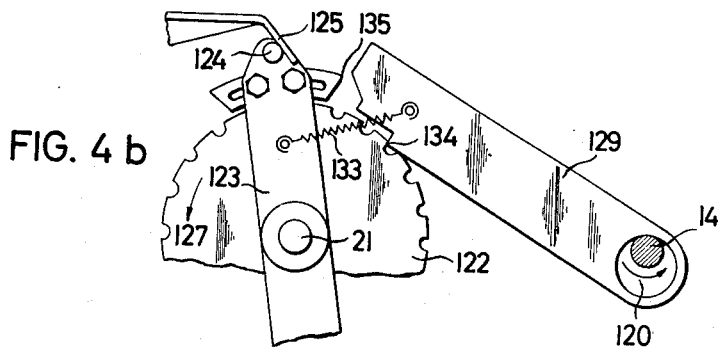
Figure 4C:
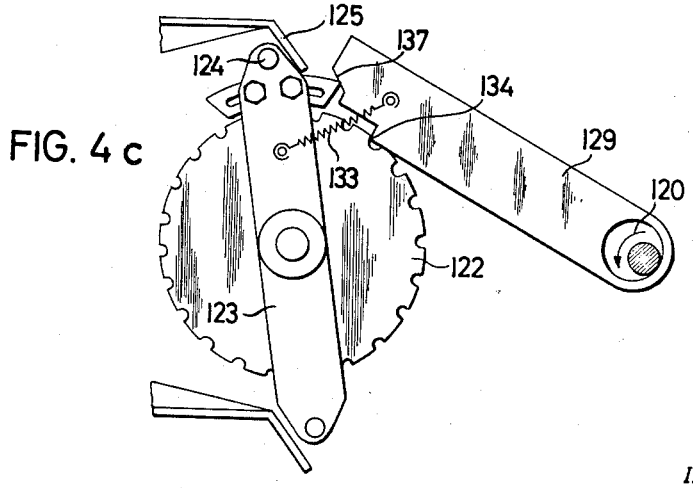

Tension shoes 15 and 16 which are slidable on the two stringers of chain 7 are mounted on levers 17 and 18, respectively, which are pivotable about fixed axes and the outer ends of which are acted upon by a compression spring 19 whereby the tension shoes 15 and 16 are constantly pressed against the two chain runs. As illustrated in greater detail in FIGURES 4a to 4c, a ratchet wheel 122 which is secured to the tightening spindle 21 is actuated by a shift rod 129 which is secured eccentrically on the setting spindle 14. A tightening movement is started when one of the inclined cam surfaces 125 which are provided on the tension shoes approaches the chain tightening spindle and thereby engages with and pushes back one of the rods 124 which are rigidly secured to a rocker 123. This rocker which is loosely mounted on the tightening spindle is thereby turned which causes the shift rod 129 to drop down upon the ratchet wheel 122 as illustrated in FIGURE 4b. If the setting spindle 14 is then turned, shift rod 129 will engage with its edge 134 into the ratchet wheel 122 and turn the same in a step-by-step motion whereby the tightening spindle will be turned and the chain be tightened. As long as the chain has a proper tension, shift rod 129 is in the position as illustrated in FIGURE 4a, in which it engages with its recessed part 136 with the nose 135 of an adjustable setting element 132 which is connected to the rocker 123. By the action of a spring 133, these parts will remain in engagement until one of the cam surfaces 125 engages upon one of rods 124. However, when the rocker 123 is pivoted away to the position as illustrated in FIGURE 4b, shift rod 129 will slide off the nose 135 of the setting element 132. After the chain has been tightened, the cam surface 125 again disengages from rod 124 so that rocker 123 will be drawn by spring 133 in the direction toward shift rod 129 until nose 135 engages with the inclined surface 137 of the shift rod, as indicated in FIGURE 4c. Spring 133 insures that during a return movement of the shift rod, nose 135 will slide along the inclined surface 137 until it enters into the notch 136 whereby the edge 134 of the shift rod is disengaged from the ratchet wheel 122. During the further movements of the shift rod, the same will not engage with the ratchet wheel until, when another expansion of the chain occurs, one of the cam surfaces 125 will again engage with one of the rods 124 and thereby pivot the rocker 123 out of its normal position.

Assuming the direction of rotation of the setting spindle 14 to be as indicated by the arrow 127, shift rod 129 according to FIGURE 4a will carry out a common pivoting movement together with rocker 123 and its setting element 132. Edge 134 will then not engage into ratchet wheel 122. When the chain tension decreases, the cam surfaces 125 of tension shoes 15 engage with rod 124 of rocker 123 and swing the latter outwardly so that the shift rod, drawn by spring 133, will then engage into ratchet wheel 122. If the setting spindle 14 is adjusted in the direction of arrow 120, the ratchet wheel is therefore shifted by one tooth in the direction of arrow 127. The end of this rotary movement is indicated in FIGURE 4c. By the rotary movement of setting spindle 14, the eccentric is then shifted to its outermost position and shift rod 129 has advanced the ratchet wheel 122 by one tooth and has thus tightened the chain, whereby the tension shoes 15 have been moved apart so that the cam surfaces 125 on the tension shoes have also been disengaged from rod 124. The rocker is therefore free and the nose 135 engages with the inclined surface 137 of shift rod 129. Thus, possibly after a further advance by one tooth, the parts are again in their original position as shown in FIGURE 4a.

The same effect may also be attained if the movement of the shift rod is not produced by the setting spindle but by one of the shafts of the transmission. The main shaft 2 then carries a worm 117 which drives the worm wheel 119 at a highly reduced speed by means of drive shaft 115 having worm wheel 116 in mesh with worm 117 and worm 114 and mesh with worm wheel 119. This worm wheel 119 is freely rotatable on the setting spindle 14 and carries an eccentric 118 on which the shift rod 129 is mounted. When the main shaft 2 is rotated, shift rod 129 will continuously carry out reciprocating movements of a low frequency which may be utilized in the manner as above described for retightening the chain by means of a ratchet device 121.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. In an infinitely variable transmission having a housing, a pair of transmission shafts rotatably mounted in said housing, two pairs of conical pulley disks within said housing and each pair mounted on one of said shafts, flexible endless power transmitting means connecting said two pairs of disks and adapted to travel between them under a certain tension, adjusting means comprising a tightening spindle rotatably mounted in said housing centrally between and parallel to said shafts and a setting spindle rotatably mounted in said housing near one end thereof, both of said spindles having oppositely directed threads at opposite sides of the central plane of said transmission, a pair of threaded members on each of said spindles and engaging with said threads thereof and being movable in opposite directions along each spindle when the same is turned, a pair of levers pivotably mounted on said threaded members on said setting spindle so that, when said setting spindle is turned, said levers are equally pivoted in opposite directions to each other about their pivot points on said tightening spindle to vary the transmission ratio of said transmission, a ratchet device comprising a ratchet wheel secured to said tightening spindle and a shift rod eccentrically mounted at one end on said setting spindle so as to be reciprocated thereby when said setting spindle is turned and its other end adapted to engage with the teeth of said ratchet wheel end thereby to turn said wheel and thus also said tightening spindle in one direction to tighten said transmitting means, and means for gauging the tension of said transmitting means and for controlling the operation of said ratchet device comprising tension shoes, spring means for applying said tension shoes upon and in sliding engagement with one side of the two runs of said transmitting means, a rocker pivotally mounted on said tightening spindle and in its normal position when said transmitting means has an adequate tension being adapted to engage with said shift rod to hold the same in its inactive position in which it is disengaged from said ratchet wheel so that said tightening spindle then remains stationary, and at least one cam member on and movable with at least one of said tension shoes when the tension of said transmitting means decreases whereby the position of said tension shoe is changed accordingly, said cam member then being adapted to engage with and to pivot said rocker about said tightening spindle and thereby to disengage said rocker from said shift rod to permit the latter to move to its active position, so that when said setting spindle is turned, said shift rod can then engage with and turn said ratchet wheel and thus also said tightening spindle and thereby tighten said transmitting means.

2. In an infinitely variable transmission having a housing, a pair of transmission shafts rotatably mounted in said housing, two pairs of conical pulley disks within said housing and each pair mounted on one of said shafts, flexible endless power transmitting means connecting said two pairs of disks and adapted to travel between them under a certain tension, adjusting means comprising a tightening spindle rotatably mounted in said housing centrally between and parallel to said shafts and a setting spindle rotatably mounted in said housing near one end thereof, both of said spindles having oppositely directed threads at opposite sides of the central plane of said transmission, a pair of threaded members on each of said spindles and engaging with said threads thereof and being movable in opposite directions along each spindle when the same is turned, a pair of levers pivotably mounted on said threaded members on said setting spindle so that, when said setting spindle is turned, said levers are equally pivoted in opposite directions to each other about their pivot points on said tightening spindle to vary the transmission ratio of said transmission, a worm secured to one of said transmission shafts, a worm wheel on and rotatable relative to said setting spindle, worm means connecting said worm and worm wheel to each other so that said worm wheel will be very slowly driven when said transmission is in operation, a ratchet device comprising a ratchet wheel secured to said tightening spindle, and a shift rod eccentrically mounted at one end on said worm wheel and adapted to be reciprocated thereby and its other end adapted to engage with the teeth of said ratchet wheel and thereby to turn the latter and thus also said tightening spindle in one direction to tighten said transmitting means, and means for gauging the tension of said transmitting means and for controlling the operation of said ratchet device comprising tension shoes, spring means for applying said tension shoes upon and in sliding engagement with one side of the two runs of said transmitting means, a rocker pivotably mounted on said tightening spindle and in its normal position when said transmitting means has an adequate tension being adapted to engage with said shift rod to hold the same in its inactive position in which it is disengaged from said ratchet wheel so that said tightening spindle then remains stationary, and at least one cam member on and movable with at least one of said tension shoes when the tension of said transmitting means decreases whereby the position of said tension shoe is changed accordingly, said cam member then being adapted to engage with and to pivot said rocker about said tightening spindle and thereby to disengage said rocker from said shift rod to permit the latter to move to its active position, so that said shift rod can then engage with and turn said ratchet wheel and thus also said tightening spindle and thereby tighten said transmitting means.

3. In an infinitely variable transmission having a housing, a pair of transmission shafts rotatably mounted in said housing, two pairs of conical pulley disks within said housing and each pair mounted on one of said shafts, flexible endless power transmitting means connecting said two pairs of disks and adapted to travel between them under a certain tension, adjusting means comprising a tightening spindle rotatably mounted in said housing centrally between and parallel to said shafts and a setting spindle rotatably mounted in said housing near one end thereof, both of said spindles having oppositely directed threads at opposite sides of the central plane of said transmission, a pair of threaded members on each of said spindles and engaging with said threads thereof and being movable in opposite directions along each spindle when the same is turned, a pair of levers pivotably mounted on said threaded members on said setting spindle so that, when said setting spindle is turned, said levers are equally pivoted in opposite directions to each other about their pivot points on said tightening spindle to vary the transmission ratio of said transmission, a ratchet device comprising a ratchet wheel secured to said tightening spindle and a shift rod eccentrically mounted at one end on said setting spindle so as to be reciprocated thereby when said setting spindle is turned and its other end adapted to engage with the teeth of said ratchet wheel and thereby to turn said wheel and thus also said tightening spindle in one direction to tighten said transmitting means, and means for gauging the tension of said transmitting means and for controlling the operation of said ratchet gear comprising tension shoes, spring means for applying said tension shoes upon and in sliding engagement with one side of the two stringers of said transmitting means, a rocker pivotably mounted on said tightening spindle, a setting member adjustably secured to said rocker near the outer end thereof and adapted when said rocker is in its normal inactive position when said transmitting means has an adequate tension to engage with said shift rod to hold the same in its inactive position in which it is disengaged from said ratchet wheel so that said tightening spindle then remains stationary, at least one cam member on and movable with at least one of said tension shoes when the tension of said transmitting means decreases, whereby the position of said tension shoe is changed accordingly, said cam member then being adapted to engage with and to pivot said rocker about said tightening spindle and away from said shift rod so as to disengage said setting member from said shift rod, so that when said spindle is turned, said shift rod can then engage with and turn said ratchet wheel and thus also said tightening spindle and thereby tighten said transmitting means, and a tension spring connecting said rocker with said shift rod for holding said setting member in said disengaged position and for drawing said setting member into the operative engagement with said ratchet wheel when said rocker is pivoted by said inclined member.

4. In an infinitely variable transmission having a housing, a pair of transmission shafts rotatably mounted in said housing, two pairs of conical pulley disks within said housing and each pair mounted on one of said shafts, flexible endless power transmitting means connecting said two pairs of disks and adapted to travel between them under a certain tension, adjusting means comprising a tightening spindle rotatably mounted in said housing centrally between and parallel to said shafts and a setting spindle rotatably mounted in said housing near one end thereof, both of said spindles having oppositely directed threads at opposite sides of the central plane of said transmission, a pair of threaded members on each of said spindles and engaging with said threads thereof and being movable in opposite directions along each spindle when the same is turned, a pair of levers pivotally mounted on said threaded members on said setting spindle so that, when said setting spindle is turned, said levers are equally pivoted in opposite directions to each other about their pivot points on said tightening spindle to vary the transmission ratio of said transmission, a worm secured to one of said gear shafts, a worm wheel on and rotatable relative to said setting spindle, worm means connecting said worm and worm wheels to each other so that said worm wheel will be very slowly driven when said gear is in operation, a ratchet gear comprising a ratchet wheel secured to said tightening spindle, and a shift rod eccentrically mounted at one end on said worm wheel and adapted to be reciprocated thereby and its other end adapted to engage with the teeth of said ratchet wheel and thereby to turn the latter and thus also said tightening spindle in one direction to tighten said transmitting means, and means for gauging the tension of said transmitting means and for controlling the operation of said ratchet device comprising tension shoes, spring means for applying said tension shoes upon and in sliding engagement with one side of the two runs of said transmitting means, a rocker pivotably mounted on said tightening spindle, a setting member adjustably secured to said rocker near the outer end thereof and adapted when said rocker is in its normal inactive position when said transmitting means has an adequate tension to engage with said shift rod to hold the same in its inactive position in which it is disengaged from said ratchet wheel so that said tightening spindle then remains stationary, at least one cam member on and movable with at least one of said tension shoes when the tension of said transmitting means decreases, whereby the position of said tension shoe is changed accordingly, said cam member being then adapted to engage with and to pivot said rocker about said tightening spindle and away from said shift rod so as to disengage said setting member from said shift rod, so that said shift rod can then engage with and turn said ratchet wheel and thus also said tightening spindle and thereby tighten said transmitting means, and a tension spring connecting said rocker with said shift rod for holding said setting member in said disengaged position and for drawing said setting member into the operative engagement with said ratchet wheel when said rocker is pivoted by said inclined member.

References Cited in the file of this patent
UNITED STATES PATENTS

| | | |
|---|---|---|
| 2,112,157 | Hatcher | Mar. 22, 1938 |
| 2,266,687 | Keller | Dec. 16, 1941 |